United States Patent
Holmes

(10) Patent No.: US 11,203,447 B1
(45) Date of Patent: Dec. 21, 2021

(54) PROPULSION SYSTEM FOR SPACE VEHICLES

(71) Applicant: Government of the United States, as represented by the Secretary of the Air Force, Wright-Patterson AFB, OH (US)

(72) Inventor: Michael Holmes, Boron, CA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 385 days.

(21) Appl. No.: 16/286,719

(22) Filed: Feb. 27, 2019

Related U.S. Application Data

(60) Provisional application No. 62/671,396, filed on May 14, 2018.

(51) Int. Cl.
*B64G 1/24* (2006.01)
*B64G 1/40* (2006.01)
*B64G 1/00* (2006.01)
*B64G 1/42* (2006.01)

(52) U.S. Cl.
CPC ............ *B64G 1/007* (2013.01); *B64G 1/242* (2013.01); *B64G 1/405* (2013.01); *B64G 1/425* (2013.01)

(58) Field of Classification Search
CPC . B64G 1/007; B64G 1/405; B64G 2001/1092
See application file for complete search history.

(56) References Cited

U.S. PATENT DOCUMENTS

| | | | | |
|---|---|---|---|---|
| 4,384,692 A * | 5/1983 | Preukschat | .......... | B64G 1/1007 136/292 |
| 5,595,360 A * | 1/1997 | Spitzer | .................. | B64G 1/007 244/158.5 |
| 5,779,195 A * | 7/1998 | Basuthakur | ............ | B64G 1/007 244/173.1 |
| 6,260,804 B1 * | 7/2001 | Anderson | ............ | B64G 1/007 244/159.4 |
| 6,541,916 B2 * | 4/2003 | Decker | .................. | B64G 1/406 315/77 |
| 6,581,880 B2 | 6/2003 | Randolph et al. | | |
| 6,669,148 B2 * | 12/2003 | Anderman | .............. | B64G 1/007 244/172.4 |
| 7,113,851 B1 * | 9/2006 | Gelon | .................... | B64G 1/007 701/13 |

(Continued)

OTHER PUBLICATIONS

Wikipedia contributors. "Hall-effect thruster." Wikipedia, The Free Encyclopedia. Wikipedia, The Free Encyclopedia, Apr. 27, 2018. Available at https://en.wikipedia.org/w/index.php?title=Hall-effect_thruster&oldid=838562647.*

*Primary Examiner* — Joseph W Sanderson
(74) *Attorney, Agent, or Firm* — AFMCLO/JAZ; Matthew D. Fair

(57) ABSTRACT

An electric propulsion module coupled to a spacecraft capable of providing thrust at a level required for multi-burn orbit transfer is disclosed herein. The electric propulsion system includes an electric propulsion thruster, a propellant tank and an energy storage device. In one form the energy storage device is a battery operable to provide sufficient power to maneuver the spacecraft quickly to avoid space debris and/or move to a different orbit through a multi-burn thrust procedure.

21 Claims, 2 Drawing Sheets

(56) References Cited

U.S. PATENT DOCUMENTS

| | | | |
|---|---|---|---|
| 7,387,279 B2* | 6/2008 | Anderman | B64G 1/007 244/158.9 |
| 7,665,695 B2* | 2/2010 | Wang | B64G 1/244 244/164 |
| 7,922,124 B2* | 4/2011 | Soldi | B64G 1/428 244/158.8 |
| 8,468,794 B1* | 6/2013 | Patterson | F03H 1/0037 60/202 |
| 9,494,143 B1* | 11/2016 | Patterson | H01J 27/024 |
| 9,963,248 B2* | 5/2018 | Wang | B64G 1/283 |
| 10,442,558 B2* | 10/2019 | Duchemin | B64G 1/26 |
| 10,479,534 B1* | 11/2019 | Baghdasarian | B64G 1/10 |
| 10,589,879 B2* | 3/2020 | Baldwin | B64G 1/645 |
| 2002/0100841 A1* | 8/2002 | Decker | F03H 1/0018 244/171.1 |
| 2003/0164428 A1* | 9/2003 | Anderman | B64G 1/007 244/172.4 |
| 2005/0067534 A1* | 3/2005 | Anderman | B64G 1/1078 244/172.4 |
| 2007/0029446 A1* | 2/2007 | Mosher | B64G 1/10 244/158.1 |
| 2008/0135685 A1* | 6/2008 | Soldi | B64G 1/242 244/169 |
| 2011/0037427 A1* | 2/2011 | Boncyk | B60L 58/22 320/107 |
| 2013/0263441 A1* | 10/2013 | Boncyk | H02J 7/0068 29/623.1 |
| 2015/0021439 A1* | 1/2015 | Duchemin | B64G 1/26 244/171.1 |
| 2015/0083865 A1* | 3/2015 | Nakasone | B64G 1/428 244/158.6 |
| 2017/0305579 A1* | 10/2017 | Lu | B64G 1/406 |
| 2018/0354659 A1* | 12/2018 | Baldwin | B64G 1/405 |
| 2019/0248515 A1* | 8/2019 | Hakamada | B64G 9/00 |
| 2020/0102100 A1* | 4/2020 | Lozano | B64G 1/64 |

\* cited by examiner

PROPULSION SYSTEM FOR SPACE VEHICLES

RIGHTS OF THE GOVERNMENT

The invention described herein may be manufactured and used by or for the Government of the United States for all governmental purposes without the payment of any royalty.

TECHNICAL FIELD

The present disclosure generally relates to a propulsion system for space vehicles and more particularly, but not exclusively to moving the space vehicle into a different orbit and/or for avoiding foreign objects with an electric propulsion thruster.

BACKGROUND

Space vehicles such as satellites or the like typically use chemical rocket propulsion to escape earth's gravitational force to enter into a desired orbit. Some space vehicles use electric propulsion in deep space to propel the space craft towards a desired location such as another planet. However, prior art electrical propulsion systems are not powerful enough to escape a gravitational force of a planet or to change orbits quickly to avoid a foreign object directed toward its path. Existing systems have various shortcomings, drawbacks, and disadvantages relative to certain applications. Accordingly, there remains a need for further contributions in this area of technology.

SUMMARY

One embodiment of the present disclosure includes a unique propulsion module for a spacecraft configured to provide capability for maneuvering to a different orbit and/or to avoid foreign objects. Other embodiments include apparatuses, systems, devices, hardware, methods, and combinations wherein an electric propulsion system provides a long lasting power supply capable of rapidly maneuvering a spacecraft in orbit. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
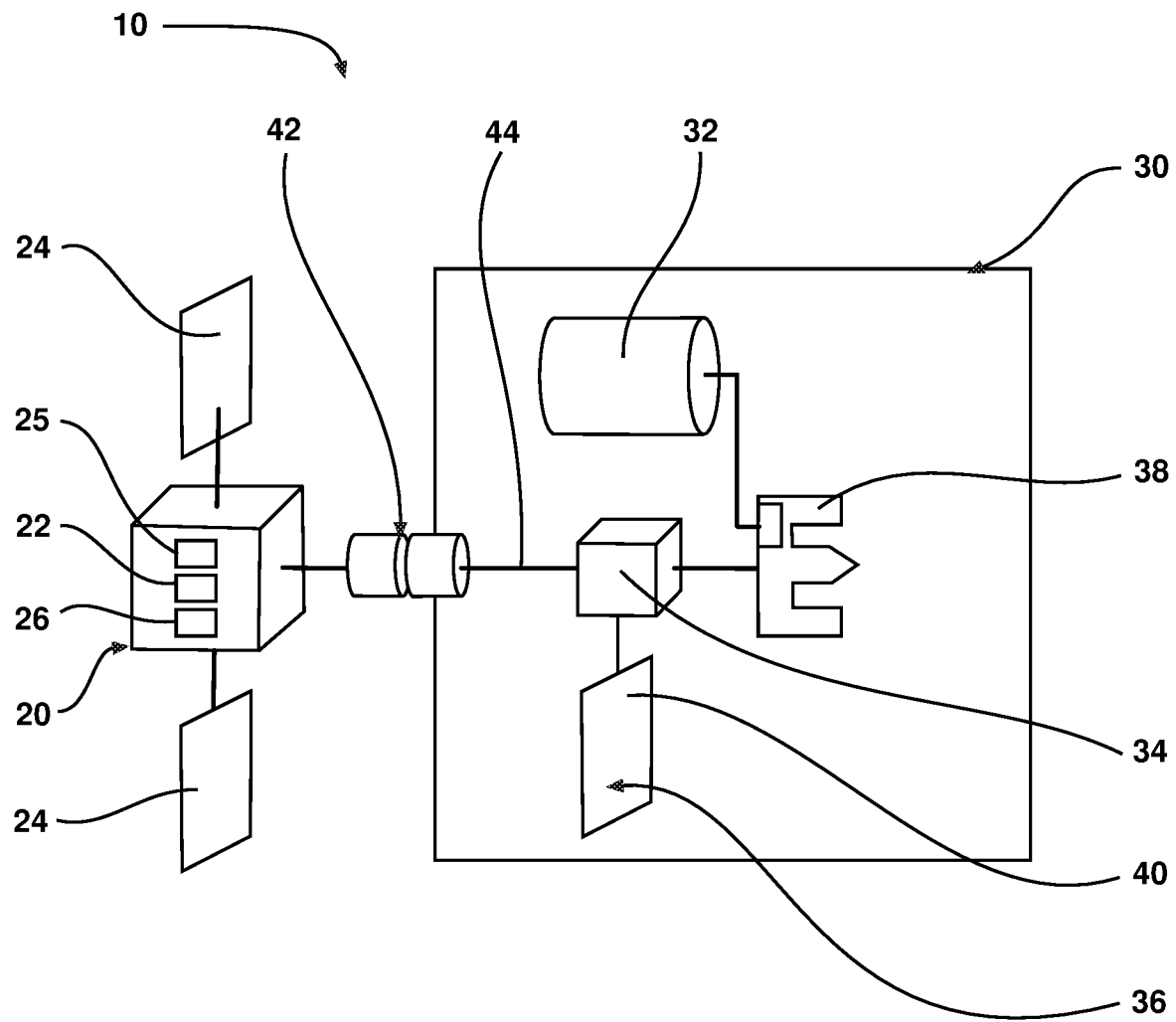
FIG. 1 is a schematic view of an exemplary spacecraft with a propulsion module coupled thereto according one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure defines a high power electric propulsion system with sufficient energy storage capability to enable orbit transfer and maneuvering strategies for a spacecraft that previously required both chemical and electric propulsion. This invention increases the maneuverability and agility of spacecraft by combining electric rocket engines with a mechanism for energy capture and storage. This combination is then packaged into a propulsion module and coupled to a spacecraft. The propulsion module can be coupled with old spacecraft already designed and/or in service (in orbit) as well as with a new or unlaunched spacecraft. The energy storage mechanism can include any high energy density lightweight technology capable of spaceflight. One example of an energy storage device suitable for spaceflight is a lithium-ion rechargeable battery, however other types of energy storage are contemplated herein. Other types of energy storage means may be used in some embodiments. For example other chemical batteries, flywheels or thermal energy storage devices are contemplated by the present disclosure. The potential energy of the flywheel and thermal energy storage can be transformed into electrical energy through generator means and electro-thermal means as would be understood by one skilled in the art.

During operation of the spacecraft, energy is collected, stored and continuously supplied for spacecraft operation and/or electric propulsion control. The collected energy is used to power the electric rocket engines at precise intervals along the orbital path to maximize maneuvering efficiency. The apparatus and methods disclosed herein increases payload mass, decreases the time to change orbits, and provides for the ability to maneuver quickly on short notice relatively to that of the prior art spacecraft systems.

Launch vehicles typically boost the spacecraft from Earth's surface to a Low Earth Orbit (LEO). Then some type of rocket propulsion is required to boost the spacecraft to higher orbits. Spacecraft that are headed to destinations outside of an earth orbit have similar types of propulsion needs. Going to Jupiter, for example, requires leaving Earth orbit, entering orbit about the Sun, raising the solar orbit to one that intersects Jupiter's orbit, and then entering and lowering orbit about Jupiter. These types of propulsive activities are referred to as orbit changes.

Once at the destination orbit, spacecraft may need to maneuver, however in the past only relatively small perturbations in trajectory or position could be accomplished with the electric propulsion systems carried on board. This invention provides a capability to efficiently and quickly change orbits around Earth or other extraterrestrial bodies, to maneuver rapidly if needed to avoid foreign objects such as space debris or the like, and to maximize the number of maneuvers that can be performed with a minimal amount of propellant.

Chemical thrusters can quickly change orbits, but require large amounts of propellant to do so. This inefficiency in propellant usage reduces the amount of payload that can be carried and can also reduce the lifetime of the spacecraft if its mission requires propellant on orbit for maneuvering. For example, a spacecraft sent to Geostationary Earth Orbit (GEO) using chemical propulsion accounts for only a very small fraction of the mass launched into an initial orbit from Earth. In other words, the propellant expended to get the spacecraft to orbit weighs much more than the spacecraft itself. Any additional propellant mass to do on-orbit maneuvering would require removing some of the spacecraft mass because there is simply too little mass margin on a typical spacecraft.

Unlike chemical rocket thrusters, electrical propulsion (EP) thrusters can transfer orbits and maneuver using much less propellant. Electric Propulsion can eject propellant much faster than chemical propulsion. Ion thrusters and Hall thrusters can eject propellant between 10 km/s and 100 km/s whereas typical chemical rocket propulsion expels propellant between 2 km/s and 4.5 km/s. Therefore electric propulsion can provide 2 to 20 time more thrust for a given amount of propellant.

However, the thrust of a state-of-the-art EP propulsion system is limited by the low power level available from current spacecraft. Conventional EP thrusters cannot efficiently move a spacecraft into different orbits because they take too long due to the lack of power from the spacecraft. Likewise, conventional EP thrusters do not provide for responsive in-orbit maneuvering due again to the lack of power from the spacecraft. EP orbit transfers with conventional EP thrusters are slow because it takes a long time to acquire enough energy to accelerate all the propellant needed to achieve the required change of spacecraft velocity. It simply takes a long time to empty the propellant tank at low power levels. While savings of propellant mass can be achieved with current EP thruster, the continuous thrust required for the spacecraft to transfer orbits provides for a continuous spiral maneuver and is not as efficient as Hohmann transfers.

The present invention provides for increased energy collection, increased energy storage and higher thrust made possible by the disclosed EP propulsion module. The energy capacity of the EP propulsion module provide sufficient thrust capability to permit Hohmann orbit transfer and/or maneuvering capability to escape foreign object debris in the orbit flightpath. The energy capacity of the storage and collection devices are large enough to store the energy collected while the spacecraft travels through a portion of the orbit. Stored energy can be released at key points in an orbit to allow selection of optimal orbit transfer strategies. Further, once on orbit, the energy storage device would enable much higher thrust than available on conventional EP thruster systems.

The energy storage device is large enough so that an inefficient spiral orbit transfer is not required. Instead, a series of Hohmann transfers can be used to step from the initial to the final orbit. Hohmann transfers are significantly more efficient than spiral transfers and result in a savings in time and propellant mass. The mass savings of the chemical propellant will offset the additional mass of the energy storage device and EP thruster.

Any number of Electric Propulsion (EP) thrusters with various propellants may be used and will fall within the scope of the invention as one skilled in the art would readily understand. By way of example and not limitation Hall effect thrusters and Ion thrusters may be selected as EP thrusters. EP thrusters that can be throttled may be desirable in some embodiments. Hall Effect Thrusters (HETs) can be throttled which means that thrust can be increased at the expense of lower exit velocity of the propellant. At a fixed power level thrust is proportional to the inverse of the propellant exhaust velocity (1/exhaust velocity). Exhaust power is proportional to the square of the exhaust velocity ($V^2$), while thrust is directly proportional to the exhaust velocity (V). The thrust to power ratio decreases as the exhaust velocity increases, therefore lower propellant exit velocity requires less energy to accelerate. Operating at low propellant exit speed reduces propellant usage efficiency, but the higher thrust decreases the number of orbits and time required to perform a transfer. At higher altitudes the orbital periods are longer and efficient thrusting operations over a longer time interval become possible so that the HET can be throttled to low thrust and achieve higher propellant usage efficiency. Throttling can be strategically applied throughout an orbit transfer to optimize any propulsion maneuver. Throttling, which is made more effective through use of large energy storage device(s), increases spacecraft propulsive agility.

One or more energy storage device(s) may take any form that efficiently stores energy supplied by the power system. In one form the energy storage device(s) can be a battery and in a more particular form a lithium based battery. It should be understood that other battery types are contemplated and remain within the teachings of the present disclosure. In some forms, the storage device(s) can be fully charged over the period of a single orbit, but can be discharged through the EP thruster in a much shorter period of time, enabling high acceleration at critical times and locations of the orbit. Photo Voltaic Array (PVA) power systems may be used in some embodiments to provide power to the energy storage device(s), however the present invention should not be limited thereto.

In some forms, an independent power supply used for initial orbit transfer, such as a supplemental PV array, could be expendable for some applications. Ejection of the supplemental PV array can be set to occur at a point in an orbit transfer that increases overall transfer speed or provide for increased maneuverability once on orbit. For example, a supplemental PV array could be ejected towards the end of a series of periapsis thrusts before starting apoapsis thrusts. This is a point in an orbit-raising mission where the power source is no longer needed because larger orbits provide more time to charge a battery. Since the ejected mass is not raised with the spacecraft, faster orbit transfer is realized while less propellant is used. Similarly, battery mass could be ejected in an orbit lowering mission when the orbits become too short to fill the battery.

Referring now to FIG. 1, a schematic illustration of a spacecraft vehicle system 10 depicts a spacecraft 20 with an auxiliary propulsion module (PM) 30 coupled thereto. The spacecraft 20 can include any of the typical features that are required for space flight as would be known to those skilled in the art. For example the spacecraft 20 can include a relatively small battery 22 powered by a photovoltaic array 24. A computer system 25 including a CPU, input/output, memory and other necessary components can be housed in the spacecraft or in an attachable structure. The computer system 25 can control the spacecraft as is generally understood. In particular, the computer system 25 can also employ the orbital maneuver strategies for control of the PM 30.

A first thrust system 26 associated with the spacecraft 22 can include a relatively small electric propulsion thruster and/or a chemical propulsion system. The chemical propulsion system is typically used to generate enough thrust to escape earth's gravitational field and the small electric thruster can be used to make minor corrections in orbit or provide a small amount of thrust during deep space missions.

The auxiliary propulsion module (PM) 30 is connectable to the spacecraft 20 and includes sufficient power to move the spacecraft 20 to a different orbit using Hohmann orbit transfer via electric propulsion means. As described above the electric propulsion thruster (EPT) 38 may be of any form, however the EPT 38 must be capable of performing Hohmann orbit transfers as well as quickly maneuvering to avoid foreign object damage caused by random space junk or even intentional targeting. The PM 30 includes a propellant tank 32 for holding propellant such as by way of example and not limitation, Xenon gas that can be used to generate thrust by an electric propulsion thruster 38. An energy storage device such as a PM battery 34, a flywheel or thermal storage device is configured to provide power to the EPT 38 on demand. The PM battery 34 can be of any type capable of delivering power at a required voltage/amperage necessary for the EPT 38 to produce a thrust sufficient to meet maneuvering requirements.

In general the thrust from the EPT 38 produced by the propulsion module (PM) 30 can and should be made at least up to 5 to 10 times that of the standard electric thrust system 26 for a spacecraft 20 in order to achieve significant improvements in propulsion performance. In one form, the thrust for the PM 30 is approximately at least 10 times greater than that of a conventional EP system. In other forms the thrust for the propulsion module 30 can be greater than 10 times greater than for a conventional EP system. A 10 fold increase in thrust or greater is typically high enough to perform an emergency maneuver and/or a Hohmann orbit transfer at sufficiently high acceleration. However, it should be understood that a thrust increase of less than 10 times may be used with proportionally diminishing performance. By way of example, typical large spacecraft currently have approximately 20 KW of power available to the thrusters. For the same mission, the PM 30 can provide from 200 to 400 KW or even greater to the spacecraft 20.

An auxiliary PV array 36 may be connected directly to the PM Battery 34. The auxiliary PV array 36 continuously charges the PM battery 34 as long as one or more collector panels 40 are in a line of sight of a photon source such as the sun or another star. The propulsion module 30 can be coupled via a coupler 42 to the spacecraft 20. The coupler 42 provides a mechanical connection, electrical connection and data communication connection between the PM 36 and the spacecraft 20. The combination of the auxiliary PV array 36 and PM battery 34 provide the 200 to 400 KW of power required by the auxiliary electric propulsion thruster (EPT) 38. In some forms, propellant can be ejected between 100 km/s and 500 km/s or even greater from the EPT 38. Communication and power lines 44 can operably connect the spacecraft 20 to the PM 30. Electric power is directed to the battery 34 (or other energy storage system) during operation so that as much energy as possible is collected from the spacecraft 20 and stored in the battery. Power from the spacecraft 20 can be generated by a PV array, but can also include other energy source(s).

In some forms, old or previously designed spacecraft 20 can be retroactively coupled with a PM 30. This can include sending a PM 30 into space to couple with a spacecraft that is already in orbit. While beyond the scope of this patent application, one skilled in the art would readily understand how to perform the take-off, docking and coupling of a PM 30 with a spacecraft 20 already in outer space.

Figures 2A, 2B:
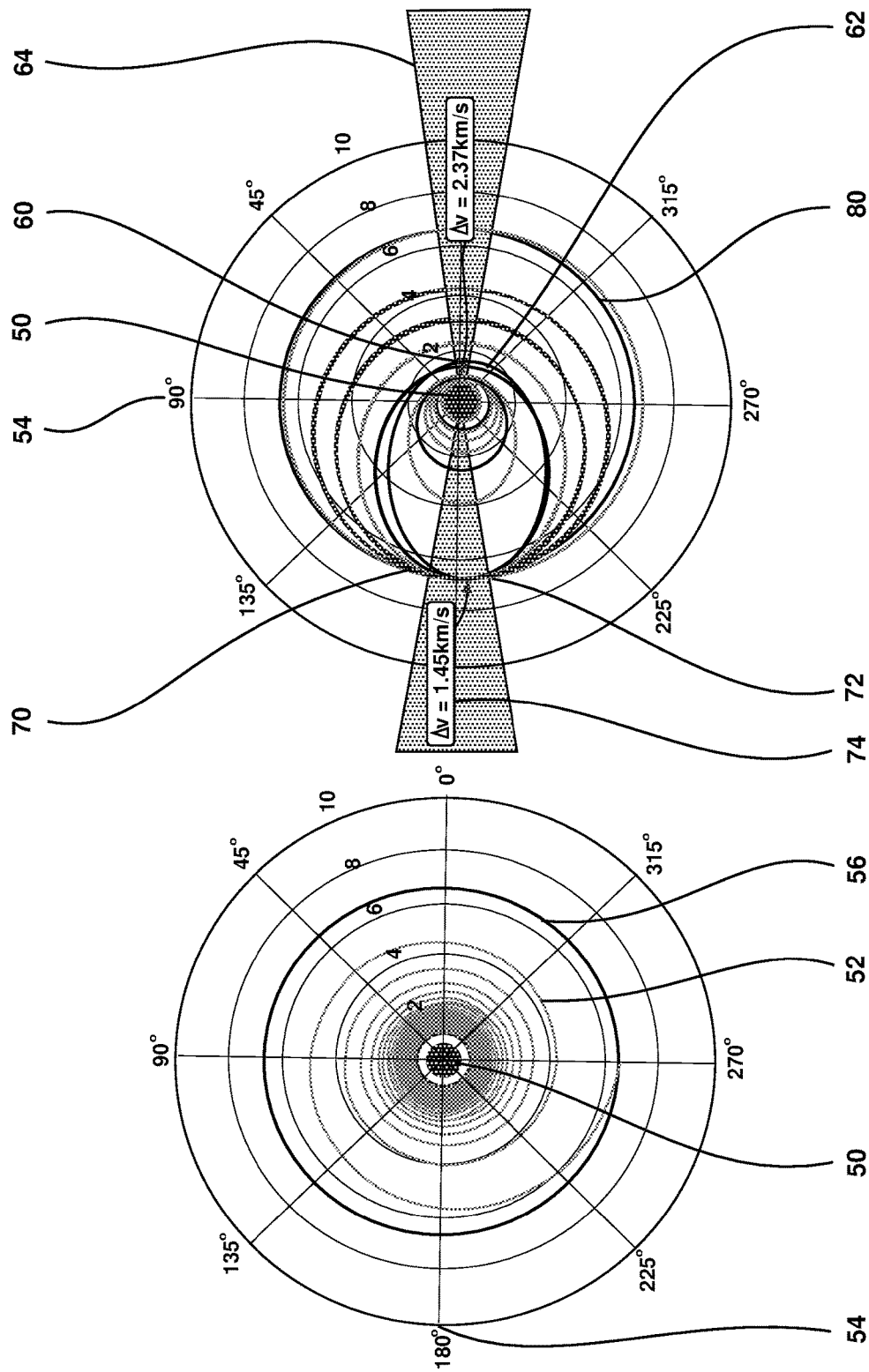
FIG. 2A is a plot illustrating a relatively slow spiral orbiting maneuver for a spacecraft.
FIG. 2B is a plot illustrating a Hohmann orbit transfer maneuver for the spacecraft using the propulsion system of FIG. 1.

FIG. 2A shows an orbital transfer schematic that uses a relatively inefficient continuous thrust necessitated by the use of an underpowered electric propulsion system. In this exemplary illustration, the spacecraft is raised from a 500 km altitude above earth 50, circular Low Earth Orbit (LEO) to a Geostationary Earth Orbit (GEO). State of the art EP thrusters accelerate the spacecraft slowly so that a spiral orbit 52 defined by a coordinate system 54 is required to reach the final orbit (GEO) 56.

FIG. 2B shows an orbit transfer schematic that uses the orbit raising strategy of multiple Hohmann maneuvers, also known as a "multi-burn" transfer, made possible by the electric PM 30 as described herein. A multi-burn trajectory is a more efficient method of changing orbit, but requires a more powerful propulsion thrust than prior art electric propulsion systems can generate. The multi-burn strategy raises the spacecraft orbit in steps by a series of multiple "burns" or thrusts. In this example, there are five periapsis burns 60 and five apoapsis burns 70. An actual mission may perform many more burns than that shown in the illustration.

The first burns occur at the periapsis 62, the closest point from Earth in the orbit. Each periapsis thrust raises the apoapsis 72, the farthest point from Earth, of the orbit. The multi-burn strategy provides for increasingly extended ellipse orbits. Eventually the periapsis burns 60 will raise apoapsis altitude to the destination orbit altitude. When this occurs, the spacecraft then starts a series of apoapsis burns 70, each of which raises the periapsis, until the elliptical orbits converge on the final circular destination orbit 80.

As a spacecraft moves through an orbit, speed increases as it "falls" towards periapsis. After passing the point of periapsis, the spacecraft slows as it climbs towards apogee. The spacecraft's speed is highest at periapsis and lowest at apoapsis. The spacecraft thruster system therefore has less time to burn near periapsis and more time to burn near apoapsis. In the illustrative example, the change in the velocity of the spacecraft 20 is a total of 2.37 km/s during the perigee burns defined at a region of efficient thrusting 64 and 1.45 km/s for the apogee burns for a total of 3.82 km/s defined at a region of efficient thrusting 74 given that the thruster burns are performed in the most efficient time and location of the orbit. This change of velocity is 0.72 km/s less than a spiral orbit-raising maneuver so that the multi-burn strategy requires less time and propellant to perform the mission.

All of the energy collected in the battery 34 during a previous orbit must be discharged over a small interval of time. The shortness of the thrust interval requires the electric propulsion thrusters 38 to provide high levels of thrust. The efficiency of a multi-burn strategy depends on thrusting at precise times close to either periapsis or apoapsis of the orbits. If the thrusting interval is too large, the efficiency will be reduced. In one form, the thruster is sized to use all the stored energy within the selected burn interval. In the interval of time used to thrust, the spacecraft will travel in an arc that is called the burn-arc.

As the spacecraft 20 orbits, the battery 34 continually receives and stores energy from the spacecraft PV arrays 24 and auxiliary arrays 36. When a periapsis burn is performed, the orbit is raised into a bigger ellipse, which increases the time before the spacecraft returns back to periapsis. Therefore, as the mission proceeds, more time is available to collect energy from the PV arrays 24, 36 and more energy is available for storage in the battery 34. The final orbit is longest and is therefore able to send the most amount of energy to the battery 34. More energy becomes available for thrusting as a spacecraft climbs, up to the capacity of the battery. The battery 34, and auxiliary arrays 36 are sized to account for the length of orbits and the propellant tank 32 is sized to hold a requisite amount of propellant required to meet mission requirements.

The EP thruster is configured to use most or all of the energy from the battery within the burn-arc portion of the orbit. The thrusting interval needs to be relatively short to maintain transfer efficiency so the thruster's power level will be high as compared to a convention EP propulsion system design. In relatively low orbits, where the spacecraft doesn't spend much time near periapsis, it will be useful to burn at high thrust because this will shorten the burn-arc and keep the transfer more efficient, thus compensating for the requirement of more propellant at high thrust. In relatively higher orbits, where there is more time in the burn-arc, the thruster may be operated at relatively lower thrust and use less propellant while not impacting the transfer time significantly.

In some aspects, certain Hall Effect Thrusters (HETs) have sufficient throttling range to enable the disclosed embodiment. LEO to GEO mission transfer times can be significantly reduced by using higher power HETs relative to conventional HET systems. Once on orbit, the disclosed propulsion module 30 will also provide significant velocity change capability similar to that available from chemical propulsion. At the same time, the performance of the propulsion module 30 will exceed the lifetime of a chemical system because the chemical system uses significantly more propellant to provide thrust for the required maneuvers to get to the destination orbit or for evasive maneuvering.

In other aspects, Electro-thermal thrusters will work sufficiently well for LEO-GEO type missions described herein. Electro-thermal thrusters have a relatively high ratio of thrust to power and could make steps between multi-burn orbits large. Electro-thermal thrusters also provide for the ability to perform large velocity change maneuvers at a final orbit. However, electro-thermal thrusters cannot be throttled to a thrust level that would allow high velocity propellant to exit the nozzle, therefore propellant usage would be higher than with equivalent power HETs.

Other possible options for electric propulsion can include electrospray thrusters or electromagnetic thrusters. These electric propulsion options can be throttled over a much larger thrust range than can HETs. While various electric propulsion systems may be used, a common requirement is that the mass of the components be kept as low as possible. Because the orbital transfers and maneuvers are done more efficiently with the disclosed propulsion module 30, less propellant is used and therefore the total mass of the spacecraft system can be reduced over the present state of the art systems.

In one aspect the present disclosure includes a spacecraft system comprising: a spacecraft configured to take off from earth and move in outer space; a primary battery connected to the spacecraft; a primary photovoltaic array (PV Array) operably coupled to the primary battery; a primary propulsion system configured to provide thrust capable of moving the spacecraft from earth to outer space; and an auxiliary propulsion module coupled to the spacecraft; wherein the auxiliary propulsion module includes: an energy storage device; a propellant tank; and an auxiliary electric propulsion thruster having a thrust rating configured to maneuver the spacecraft into another orbit via a Hohmann multi-burn transfer.

In further aspects, the present disclosure includes a system wherein the energy storage device is a battery; the battery can be a lithium based battery; the energy storage device can be one of a flywheel and a thermal storage medium; the electric propulsion thruster can be a Hall thruster with throttling capability; the electric propulsion thruster can be an Ion thruster with throttling capability; the auxiliary propulsion module includes an auxiliary photovoltaic array capable of receiving energy and transferring energy to the energy storage device; wherein the power provided by the auxiliary photovoltaic array and the energy storage device is at least five (5) times the power output of the spacecraft PV array; the propellant is ejected at 5 Km/s or greater from the auxiliary electric propulsion thruster; a coupling configured to releasably lock the auxiliary propulsion module to the spacecraft; and the coupling is configured to release the auxiliary propulsion module from the spacecraft and couple to another spacecraft.

In another aspect the present disclosure includes a space propulsion module comprising: an energy storage device; an energy collecting device; a propellant tank; an electric propulsion thruster have a thrust rating capable of maneuvering a spacecraft into another orbit via multi-burn transfer; and a coupling mechanism connectable to a spacecraft.

In refined aspects of the space propulsion module the coupling is configured to decouple the auxiliary electric propulsion thruster from one spacecraft and couple the auxiliary electric propulsion thruster to another spacecraft; the energy storage device can be battery; xenon gas propellant can be stored in the propellant tank; the coupling mechanism includes a mechanical connection, an electrical connection and/or a data communication connection; and the combined energy capacity of the energy storage device and the energy collecting device is at least is at least five (5) times the energy collected by the energy collecting device in one (1) hour.

In another aspect of the present disclosure includes a method comprising: moving a spacecraft from earth to an orbit in outer space using chemical rocket means; moving the spacecraft in outer space with a relatively low power electric propulsion system; maneuvering the spacecraft from the orbit to avoid space debris or to another orbit via Hohmann transfer means with a relative high power auxiliary electric propulsion module connected to the spacecraft; and wherein the maneuvering includes storing electrical energy in an auxiliary power source and providing at least five (5) times the power than a power output of an energy collection device to an auxiliary electric propulsion thruster.

In further aspects, the method includes an energy collection device that can be an auxiliary photovoltaic array; wherein the auxiliary power source includes the energy collection device and an auxiliary battery operably coupled to the auxiliary electric propulsion thruster; and using all of the stored energy within a selected burn interval.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A spacecraft system comprising:
a spacecraft configured to take off from earth and move in outer space;
a primary electric propulsion module including:
a primary battery connected to the spacecraft;
a primary photovoltaic array (PV Array) operably coupled to the primary battery; and
a primary electric propulsion system operably coupled to the primary PV Array; and
an auxiliary propulsion module coupled to the spacecraft;
wherein the auxiliary propulsion module includes:
an energy storage device;
a propellant tank; and
an auxiliary electric propulsion system with a thruster having a thrust rating higher than the primary electric propulsion system, the auxiliary electric propulsion system configured to maneuver the spacecraft into another orbit via a Hohmann multi-burn transfer.

2. The system of claim 1, wherein the energy storage device is a battery.

3. The system of claim 2, wherein the battery is a lithium based battery.

4. The system of claim 1, wherein the energy storage device is one of a flywheel and a thermal storage medium.

5. The system of claim 1, wherein the electric propulsion thruster is a Hall thruster with throttling capability.

6. The system of claim 1, wherein the electric propulsion thruster is an Ion thruster with throttling capability.

7. The system of claim 1, wherein the auxiliary propulsion module includes an auxiliary photovoltaic array capable of receiving energy and transferring energy to the energy storage device.

8. The system of claim 7, wherein the power provided by the auxiliary photovoltaic array and the energy storage device is at least five (5) times the power output of the spacecraft PV array.

9. The system of claim 1, wherein the propellant is ejected at 5 Km/s or greater from the auxiliary electric propulsion thruster.

10. The system of claim 1, further comprising a coupling configured to releasably lock the auxiliary propulsion module to the spacecraft.

11. The system of claim 10, wherein the coupling is configured to release the auxiliary propulsion module from the spacecraft and couple to another spacecraft.

12. A space propulsion system for a spacecraft comprising:
a primary electric propulsion system with a primary thruster; and
an auxiliary electric propulsion system including:
an auxiliary energy storage device;
an auxiliary energy collecting device;
an auxiliary propellant tank;
an auxiliary electric propulsion thruster having a thrust rating higher than the primary electric propulsion thruster, the auxiliary electric propulsion thruster being capable of maneuvering the spacecraft into another orbit via multi-burn transfer; and
a coupling mechanism configured to releasably connect the auxiliary space propulsion system to the spacecraft.

13. The space propulsion system of claim 12, wherein the coupling mechanism permits decoupling the auxiliary electric propulsion system from one spacecraft and couple the auxiliary electric propulsion system to another spacecraft in space.

14. The space propulsion system of claim 12, wherein the energy storage device is battery.

15. The space propulsion system of claim 12 further comprising xenon gas propellant stored in the propellant tank.

16. The space propulsion system of claim 12, wherein the coupling mechanism includes a mechanical connection, an electrical connection and/or a data communication connection.

17. The space propulsion system of claim 12, wherein the combined energy capacity of the energy storage device and the energy collecting device is at least five (5) times the energy collected by the energy collecting device in one (1) hour.

18. A method comprising:
moving a spacecraft from earth to an orbit in outer space;
moving the spacecraft in outer space with a primary electric propulsion system coupled to the spacecraft;
maneuvering the spacecraft from the orbit to avoid space debris or to another orbit via Hohmann transfer with an auxiliary electric propulsion system releasably connected to the spacecraft, the auxiliary electric propulsion system having a higher power output than the primary electric propulsion system; and
wherein the maneuvering includes storing electrical energy in an auxiliary power source and providing at least five (5) times the power of a power output of an energy collection device electrically connected to an auxiliary electric propulsion thruster.

19. The method of claim 18, wherein the energy collection device is an auxiliary photovoltaic array.

20. The method of claim 18, wherein the auxiliary power source includes the energy collection device and an auxiliary battery operably coupled to the auxiliary electric propulsion thruster.

21. The method of claim 18 further comprising using all of the stored energy within a selected burn interval.

* * * * *